(12) United States Patent
Lytle

(10) Patent No.: US 9,771,029 B2
(45) Date of Patent: Sep. 26, 2017

(54) BICYCLE TRAINING AID WITH INTELLIGENT CONTROLLER

(71) Applicant: Kimberly Mirella Lytle, Vienna, VA (US)

(72) Inventor: Kimberly Mirella Lytle, Vienna, VA (US)

(*) Notice: Subject to any disclaimer, the term of this patent is extended or adjusted under 35 U.S.C. 154(b) by 7 days.

(21) Appl. No.: 14/990,821

(22) Filed: Jan. 8, 2016

(65) Prior Publication Data

US 2016/0367854 A1 Dec. 22, 2016

Related U.S. Application Data

(60) Provisional application No. 62/181,604, filed on Jun. 18, 2015.

(51) Int. Cl.

| | |
|---|---|
| *A63B 24/00* | (2006.01) |
| *B60R 9/10* | (2006.01) |
| *B62H 7/00* | (2006.01) |
| *G01L 25/00* | (2006.01) |
| *G06K 9/00* | (2006.01) |
| *B62H 1/12* | (2006.01) |
| *B62K 3/00* | (2006.01) |

(52) U.S. Cl.
CPC ................ *B60R 9/10* (2013.01); *B62H 1/12* (2013.01); *B62H 7/00* (2013.01); *G01L 25/00* (2013.01); *G06K 9/00342* (2013.01); *B62K 3/00* (2013.01)

(58) Field of Classification Search
CPC .... B60R 9/10; B62H 7/00; B62H 1/12; B62K 3/00; A63B 24/00; A63B 24/0062; A63B 24/0087
See application file for complete search history.

(56) References Cited

U.S. PATENT DOCUMENTS

| | | | | |
|---|---|---|---|---|
| 2,509,937 | A * | 5/1950 | Olson ...................... | B62H 7/00 280/303 |
| 4,810,000 | A * | 3/1989 | Saunders .................. | B62H 1/12 280/293 |
| 5,338,204 | A * | 8/1994 | Herndon ................... | B62H 7/00 280/293 |
| 6,286,849 | B1* | 9/2001 | Slattery .................... | B62H 1/12 280/293 |

(Continued)

*Primary Examiner* — Glenn Richman
(74) *Attorney, Agent, or Firm* — Lytle Patent Services, LLC

(57) ABSTRACT

A bicycle training aid with intelligent controller includes a supporting member attached at one end to a bicycle retractably having a wheel disposed at the other end, an action member attached at one end thereof to the supporting member, a driving mechanism attached to the bicycle and engages the action member to cause a displacement of the action member, a sensor attached to either of the bicycle or a body of a rider, a controller, and communication devices. The intelligent controller is configured to monitor the motion status by the sensor signal, make automatically a decision that an event has occurred when a condition has been satisfied, take a procedure corresponding to an occurrence of the event, where the procedure including either of directing the driving mechanism to cause the displacement, or updating the condition according to an algorithm, and actuate the driving mechanism when directed by the procedure.

19 Claims, 14 Drawing Sheets

(56) References Cited

U.S. PATENT DOCUMENTS

| | | | |
|---|---|---|---|
| 6,360,838 B1* | 3/2002 | Kulhavy | B62M 9/06 |
| | | | 180/219 |
| 6,676,150 B1* | 1/2004 | Goldstein | B62H 1/12 |
| | | | 280/217 |
| 7,314,225 B2* | 1/2008 | Murnen | B62H 1/10 |
| | | | 280/217 |
| 7,556,277 B2* | 7/2009 | Lytle | B62H 1/12 |
| | | | 280/293 |
| 8,944,453 B1* | 2/2015 | Robertson | B62H 1/12 |
| | | | 280/293 |

* cited by examiner $$\tan\theta_T = \frac{v^2}{gr} \left(\equiv \frac{g_{CF}}{g}\right) \quad (1)$$

BICYCLE TRAINING AID WITH INTELLIGENT CONTROLLER

PRIORITY CLAIM

This application claims the benefit of U.S. Provisional Application No. 62/181,604, filed Jun. 18, 2015, having common inventorship, the entire contents of which being incorporated herein in its entirety.

CROSS-REFERENCE TO RELATED APPLICATIONS

This application contains subject matter related to U.S. Pat. No. 7,556,277, the entire contents of which are incorporated herein by reference.

FIELD

The embodiments discussed herein are related to systems and apparatuses that serve as training aids to assist new bicycle riders to learn how to balance and ride.

BACKGROUND

The possibility of scrapping one's leg when falling down frightens many children, preventing them from effectively and quickly learning how to ride a bicycle. U.S. Pat. No. 7,556,277 discloses a bicycle training aid with a remote control device as illustrated in FIG. 1. The remote control device 15 held by a supervisor transmits a wireless signal to a controller 11 on the bicycle that selectively deploys or retracts wheels 13. In a starting position, the wheels would be deployed so that the bicycle is balanced by the wheels at a slow speed, then as the child gains speed and stability, the supervisor may actuate the retraction mechanism so that the wheels are retracted away from the ground. When the child is becoming unstable, the supervisor can send an order to remotely redeploy the wheels 13 to prevent the child from falling over. Also based on a signal from the sensor attached to the bicycle, the controller may actuate a reset mechanism when the signal reached and surpassed a predetermined level.

U.S. Pat. No. 8,634,979 has disclosed an electric drive bicycle where sensors monitor motion status including pedal rotation speed, up and down inclination, traveling speed, brake information attached to the bicycle and makes automatic control of the drive motor for easy driving with assisted power.

U.S. Pat. No. 8,886,403 has disclosed a sporting bicycle with sensors and a controller for automatic control of a controllable damper. The controller memorizes route related control conditions on suspensions and dampers, and teaches the rider the best fit conditions selected from the memorized data and controls in that mode depending on a new route condition.

U.S. Pat. No. 8,825,322 has disclosed a sporting high end bicycle with sensors and a controller for controlling electric components such as suspension or gear shifting. Sensors include a seat pressure sensor.

SUMMARY

According to an aspect of the disclosure, a bicycle training aid with intelligent controller includes: a supporting member configured to be attached at one end thereof to a bicycle, having a wheel disposed at the other end, and further configured to retract or deploy with the wheel; an action member attached at one end to the supporting member in the vicinity of the other end thereof; a driving mechanism attached to the bicycle and configured to engage the action member at the other end thereof and to cause a displacement of the action member to retract or deploy the supporting member with the wheel; a sensor configured to produce a sensor signal concerning a motion status of either of the bicycle or a body of a rider; an intelligent controller configured to: monitor the motion status by receiving the sensor signal; make automatically a decision that an event has occurred when a condition has been satisfied; execute a procedure corresponding to an occurrence of the event based on the decision, the procedure including at least one of directing the driving mechanism to cause the displacement, and resetting the condition according to a predetermined algorithm; and actuate the driving mechanism when directed to do so by the procedure.

It is to be understood that both the foregoing general description and the following detailed description are exemplary and explanatory and are not restrictive of the invention, as claimed.

DETAILED DESCRIPTION

Figure 1:
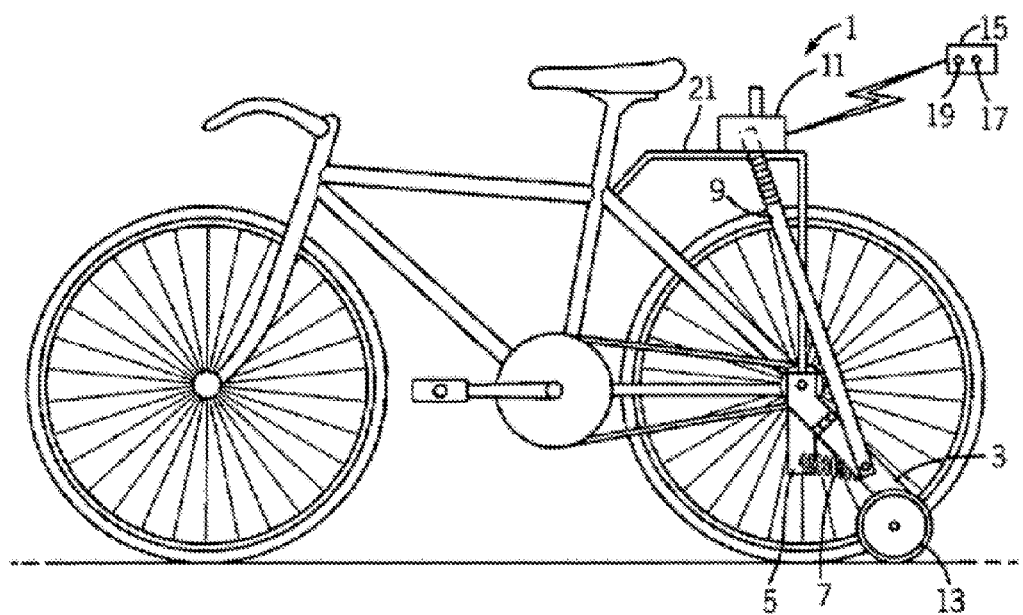
FIG. 1 is a side view of a bicycle with a bicycle training aid according to U.S. Pat. No. 7,556,277.
Figure 2:
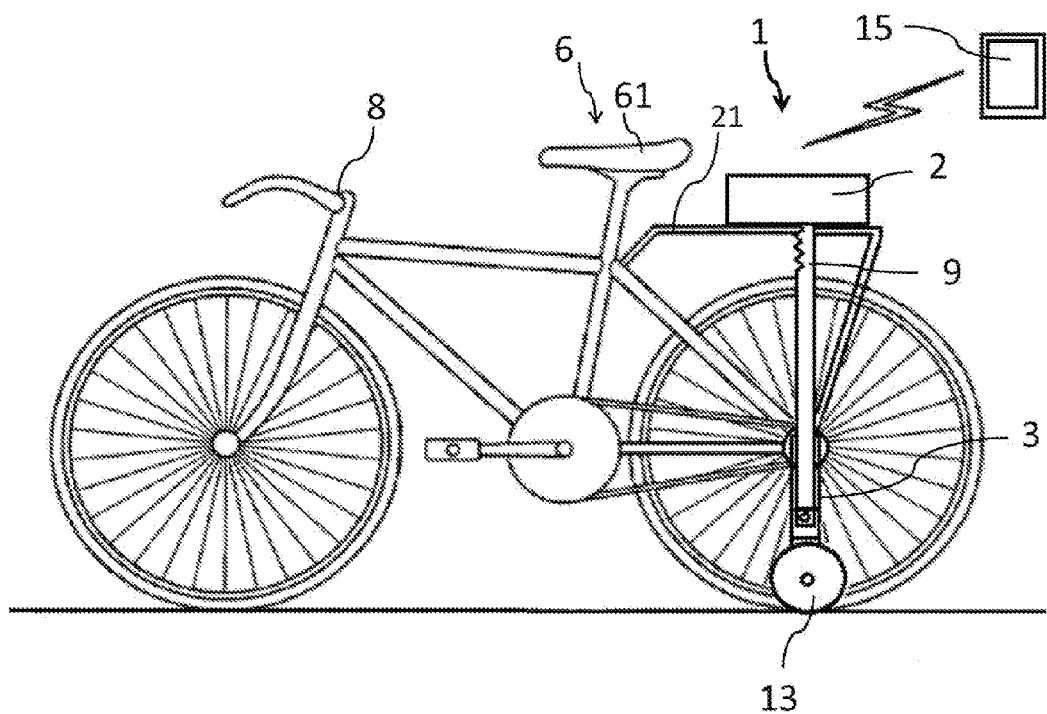
FIG. 2 is a side view of a bicycle with a bicycle training aid with intelligent controller according to one aspect of the present disclosure.
Figure 3:
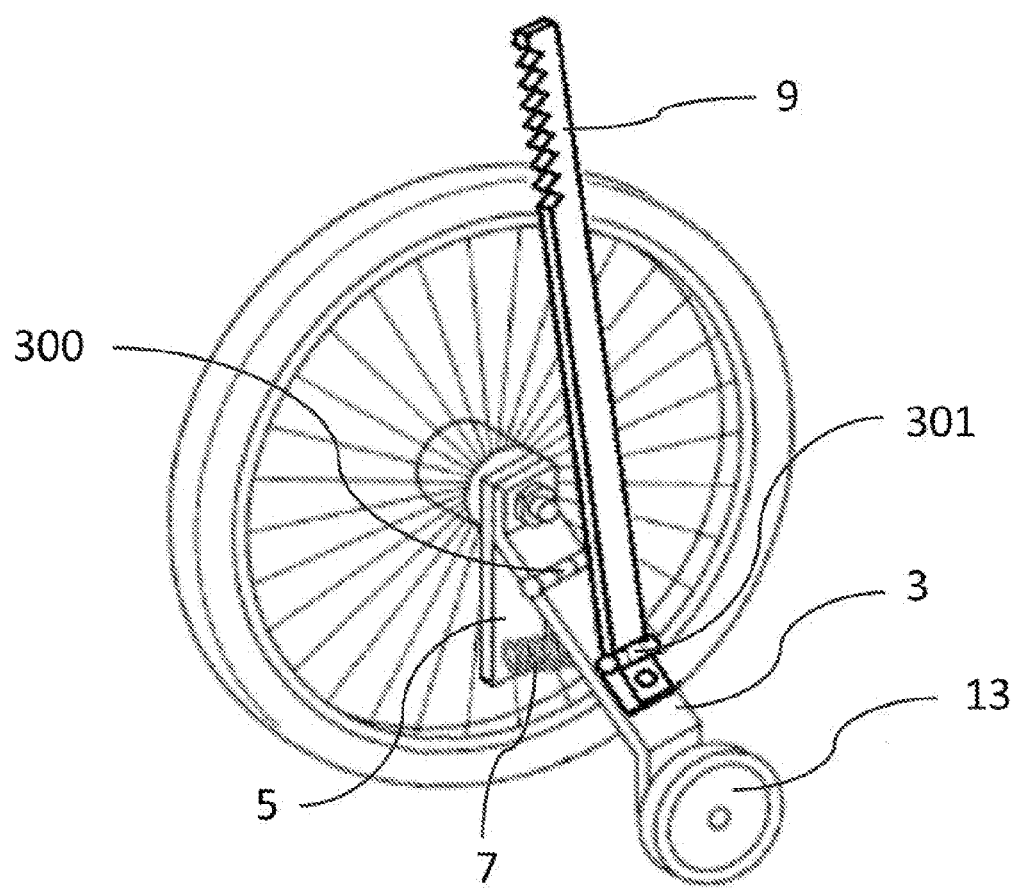
FIG. 3 is a perspective view of a lower portion of the bicycle with the bicycle training aid with intelligent controller in FIG. 2.

Referring now to the drawings, FIG. 2 illustrates a bicycle with a bicycle training aid with intelligent controller 1 according to one aspect of the present disclosure. FIG. 3 illustrates in detail a lower portion of the bicycle training aid with intelligent controller 1 in FIG. 2. The bicycle training aid with intelligent controller 1 is mountable to a frame and a hub of a typical bicycle, and includes a case 2 which is mounted on a rack 21, an action member 9 having teeth at one end, a supporting member 3 with a wheel 13 at one end and at the other end attached to the hub of the rear wheel of the bicycle via a hinge 300. The action member 9 attaches to the supporting member 3 in the vicinity of the other end thereof having the wheel 13 via another hinge 301. Thus the supporting member 3 with the wheels 13 can be retracted upwardly and then deployed downwardly, according to up and down displacements of the action member 9. A similar action member 9 and a similar supporting member 3 are on the other side of the bicycle. The hardware structure of the controller 1 is implemented in this embodiment with the hardware structure show in FIG. 18 of U.S. Pat. No. 7,556,277, appropriately programmed with code stored in a non-transitory computer readable medium according to the teachings described herein.

Figure 4A:
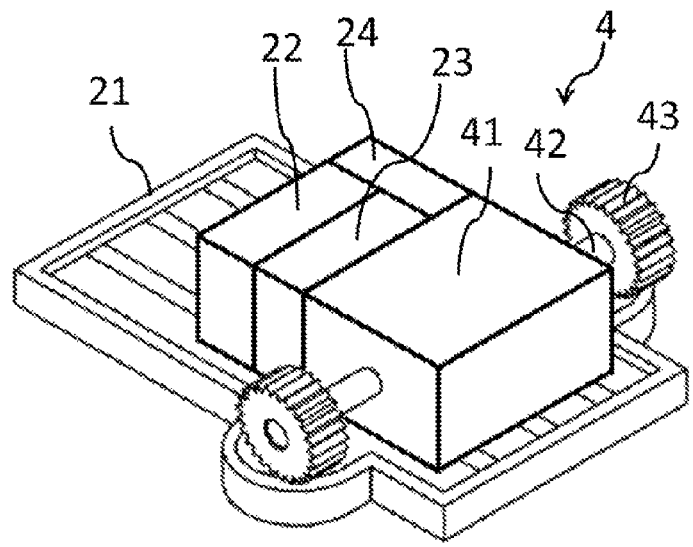
FIG. 4A is a perspective view of an inside of a case in FIG. 2, including a battery, an intelligent controller, a sensor and a driving mechanism.

FIG. 4A is a perspective view of an inside of the case 2, illustrating a battery 22, an intelligent controller 23 which is connected by a wireless communication with a remote controller 15, a sensor 24, and a driving mechanism 4 which further includes a digital servo motor 41, a shaft 42, and a gear 43. The sensor 24 generates a sensor signal concerning a motion status of either of the bicycle or a rider, and may include an orientation sensor such as a gyro sensor, an acceleration sensor, and a speed meter. Another sensor may be attached to the rider for example as a chest pocket card sensor, to a seat 6 as a seat pressure sensor 61, or to a handlebar 8 as an angular sensor. A communication device which is not illustrated here sends the sensor signal to the intelligent controller 23 and a control signal from the intelligent controller 23 to the driving mechanism 4.

Figure 4B:
FIG. 4B is a perspective view of an upper end portion of an action member with teeth.
Figure 4C:
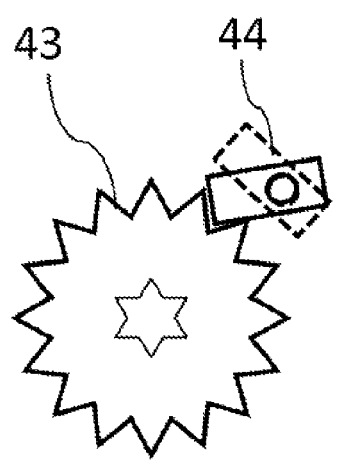
FIG. 4C is a side view of a gear and a latch, according to one aspect of the present disclosure.

The gear 43 engages with the teeth of the action member 9 illustrated in FIG. 4B, so that rotations of the gear 43 cause up and down displacements of the action member 9. As illustrated in FIG. 4C, a latch 44 may be configured to latch the gear 43 when the digital servo motor stops, in order to hold the displacements of the action member 9, and to keep the supporting member 3 with the wheels 13 at predetermined positions, maintaining a strength of the supporting member enough to prevent the bicycle from falling down when the wheels are deployed. The latch 44 optionally may also latch directly the action member 9, via the teeth thereof The intelligent controller 23 monitors the motion status of the bicycle and the rider throughout a riding exercise based on the sensor signal, and may be configured to: store data regarding the status of the bicycle and the rider, and a condition defining an occurrence of an event to be monitored; make automatically a decision that the event has occurred when the condition has been satisfied based on the sensor signals received; execute a procedure corresponding to the occurrence of the event based on the decision, the procedure including either of directing the driving mechanism 4 to cause the displacement of the action member 9 to retract or deploy the supporting member 3 with the wheel 13, or renewing the condition according to a predetermined algorithm which is also stored. The intelligent controller 23 may include a micro-processor, a memory, a non-volatile memory, input-output interfaces, communication devices and a user interface for an input and an output including a display, a touch panel and a speaker and similar to those illustrated in FIGS. 8 and 18 of U.S. Pat. No. 7,556,277.

Physical quantities to monitor the motion status of the bicycle and of the rider may include a speed of the bicycle v, a bicycle tilt $\theta_B$, a rolling angular velocity of the bicycle $\omega_B$, an expected turning tilt $\theta_T$, a rider's upper body tilt $\theta_P$, and a seat pressure $p_S$, each defined as below.

Figure 5:
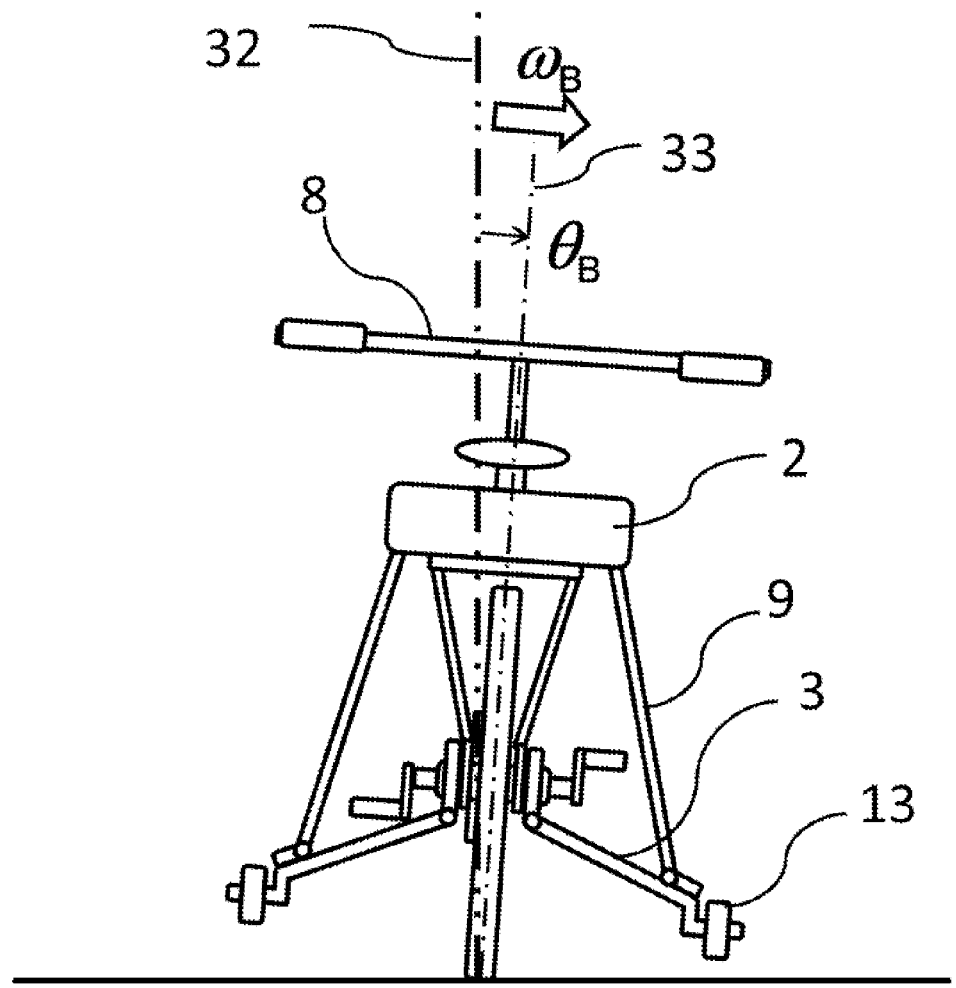
FIG. 5 is a rear view of the bicycle with the bicycle training aid with intelligent controller with wheels deployed, at a tilted condition, according to one aspect of the present disclosure.

FIG. 5 illustrates the bicycle tilt $\theta_B$, defined as an angle of a vertical axis of the bicycle 33 relative to the vertical line 32, which is a line that is orthogonal to a horizontal surface on which the bicycle supported. Angular motion of the vertical axis of the bicycle in a plane perpendicular to a longitudinal axis of the bicycle is defined as a rolling, and an angular velocity of the rolling is defined as a rolling angular velocity of the bicycle at, which is hereafter abbreviated as an angular velocity.

Figure 6A:
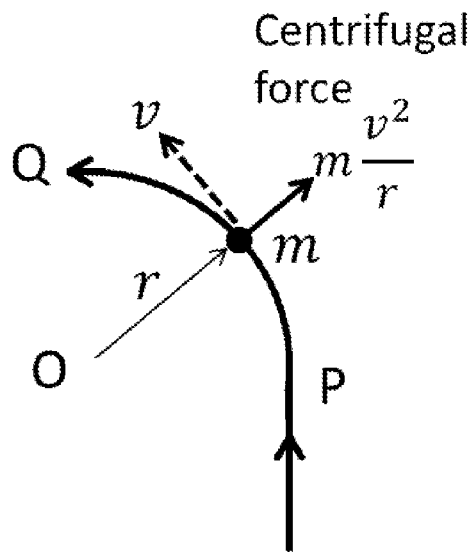
FIGS. 6A and 6B are graphs that illustrate a circular motion model in making a turn by the bicycle, according to one aspect of the present disclosure.
Figure 6B:
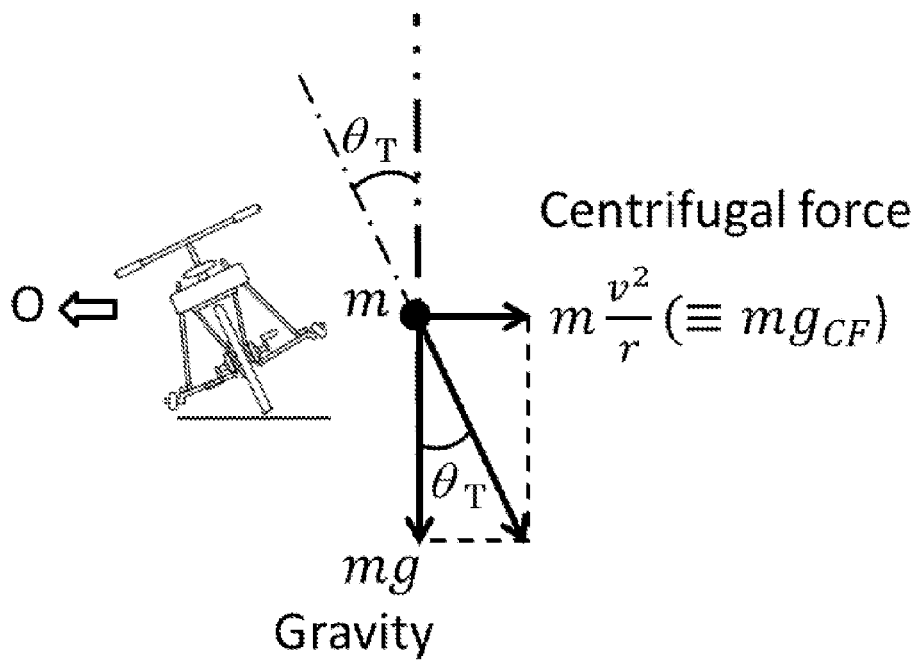

FIG. 6A illustrates a circular motion model for a turn during bicycle rides. When a turning from a point P to a point Q is approximated by a circular motion, a centrifugal force appears in a direction normal to a tangent of the bicycle's curved path. (Ref. The Lectures on Physics I, 21-3, Feynman.) As illustrated in FIG. 6B, a composition of the centrifugal force and the gravity produces an apparent gravity, which requires the rider and the bicycle to incline with a tilt $\theta_T$ toward center O side in order to balance against the apparent gravity. Here the tilt $\theta_T$ is defined as an expected turning tilt, where $\theta_T$ satisfies Eq. (1):

$$\tan\theta_T = \frac{v^2}{gr} \equiv \frac{g_{CF}}{g} \tag{1}$$

where, g, v, r, represents the gravitational acceleration, the speed of the bicycle, and the radius of the circular motion, respectively. As defined in Eq. (1), the centrifugal force due to the circular motion can be deemed due to an equivalent lateral acceleration $g_{CF}$. Based on this relation, the expected turning tilt can be estimated by measuring the equivalent lateral acceleration $g_{CF}$ by an acceleration sensor or by a gravity sensor. Alternative approach would be a combination of an angle sensor attached to the handlebar 8 for estimating the radius and the speed sensor. Since those quantities can be measured continuously, the expected turning tilt $\theta_T$ can also be monitored continuously, even though the rider does not make the turn intentionally.

Figure 7:
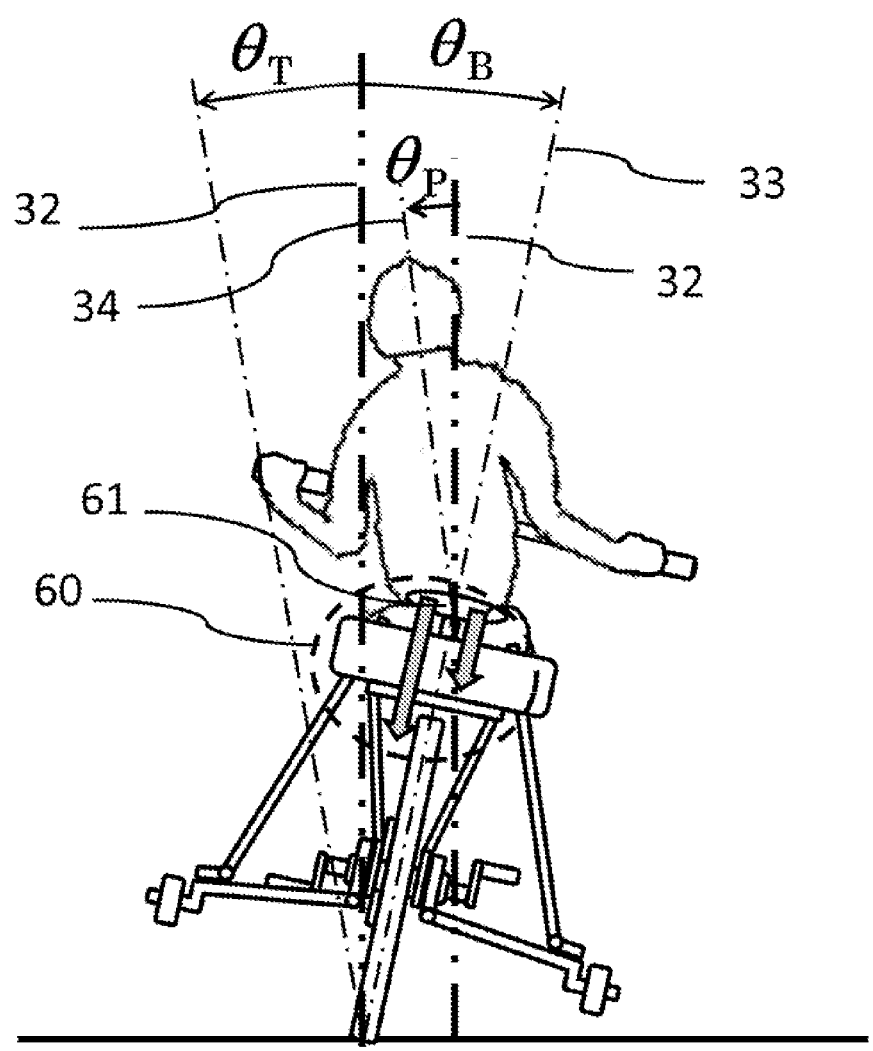
FIG. 7 is a rear view of a rider on the bicycle with the bicycle training aid with intelligent controller that illustrates concepts of an expected turning tilt and a rider's upper body tilt in a turning situation according to one aspect of the present disclosure.

FIG. 7 illustrates a situation where the expected turning tilt $\theta_T$ is comparable to the bicycle tilt in magnitude and also largely deviated from the bicycle tilt $\theta_B$ being situated in opposite sides of the vertical line each other. This is a risky situation and if the rider continues the turn in this attitude, the rider and bicycle would most probably fall over without the support of the training aids. In FIG. 7, the rider is shown trying to adjust by tilting her upper body. A rider's upper body tilt $\theta_P$ is defined as an angle of a rider's upper body axis 34 relative to the vertical line 32. A deviation of the rider's upper body tilt from the expected turning tilt $(\theta_P-\theta_T)$ or one from the bicycle tilt $(\theta_P-\theta_B)$ would be measures that are used to monitor the motion status where the rider is trying to make the turn. The seat pressure sensor 61 attached to the seat 6 can detect that the rider is on the seat and can be used to turn on or off power of the intelligent controller 23 or to transfer between a standby mode and an operation mode to save a power of the battery 22. Also as illustrated in a broken line circle 60 in FIG. 7, when the rider's upper body axis 34 is inclined to the left hand side or to the right hand side relative to the bicycle body axis 33, a seat pressure for a left half of the seat $p_{SL}$ and one for a right half of the seat $p_{SR}$, would generate a pressure difference between the two, if the seat pressure sensor was configured to be measurable each of them independently. Thus, the pressure difference may be used as a monitor of a tilt of the rider's upper body axis relative to the vertical axis of the bicycle $(\theta_P-\theta_B)$.

The bicycle training aid with intelligent controller 1 may include two operation modes; one is where the supporting member 3 with the wheels 13 are initially at deployed (a first) position to touch ground or close to ground enough to support the rider and bicycle (Mode 1), and the other is the supporting member 3 with the wheels 13 are initially at a retracted (a second) position (Mode 2.) In starting a training for the ride, a supervisor may choose through the input from the user interface, either of i) an automatic transition between the two modes according to the decision of the intelligent controller 23, ii) staying with only one of the two modes, or iii) starting initially from Mode 2 where the supervisor may push the bicycle carrying the rider until reaching a speed sufficient to gain a stability, and then move to the automatic transition.

Figure 8A:
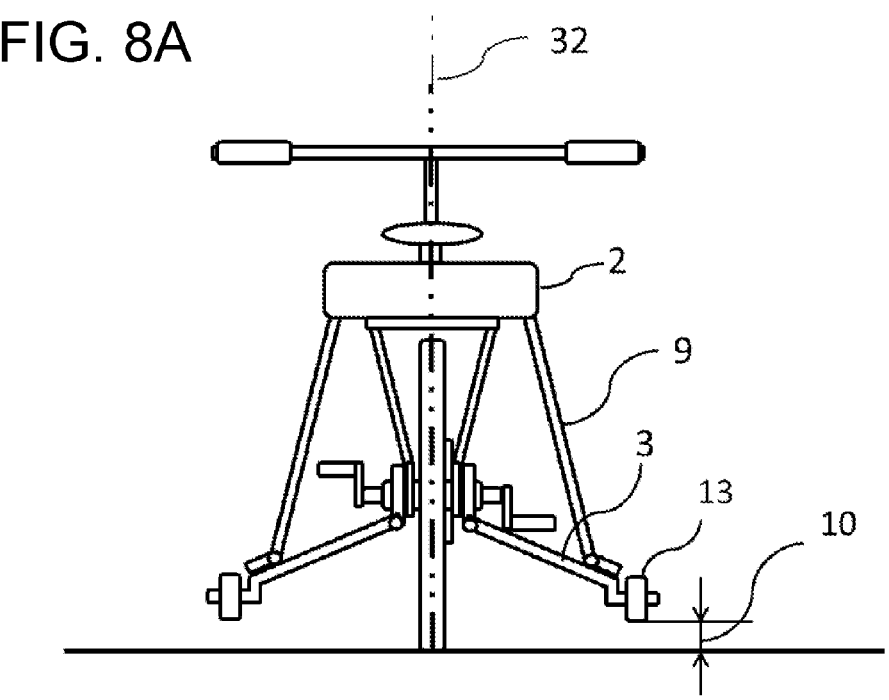
FIGS. 8A and 8B are rear views of the bicycle with the bicycle training aid with intelligent controller with the wheels deployed at a vertically balanced condition, and at a tilted condition with one of the wheels touched to ground, respectively, according to one aspect of the present disclosure.
Figure 8B:
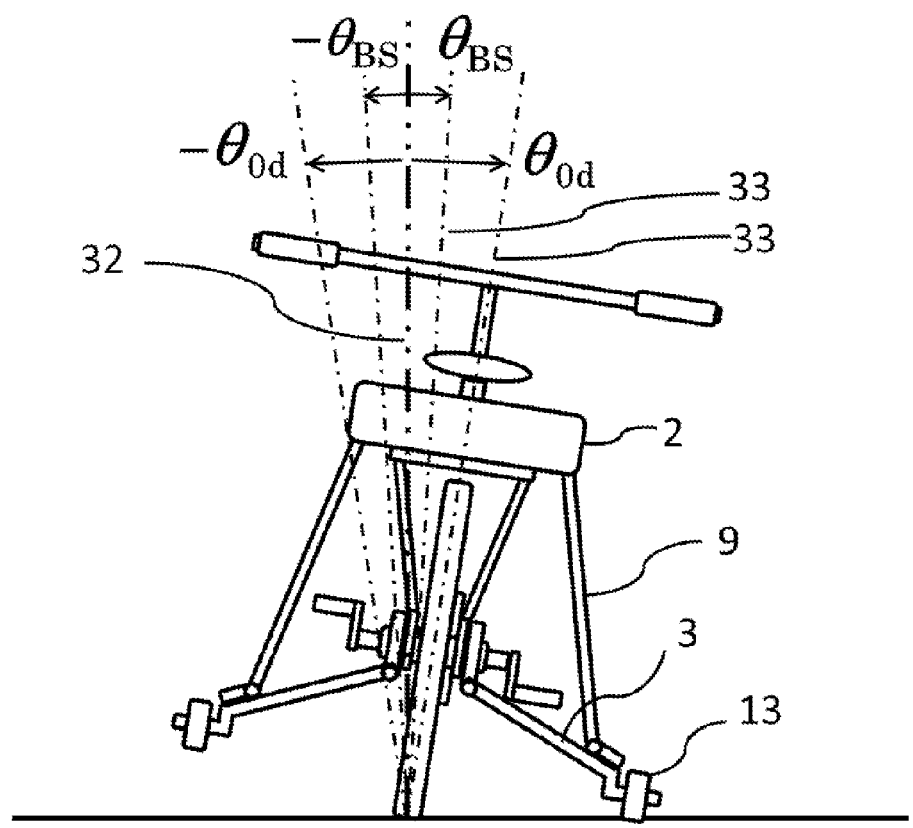

FIGS. 8A and 8B illustrate the deployed (the first) position under the Mode 1, where the wheels 13 are set slightly above ground with a gap 10 at a vertically standing position. The gap 10 allows the bicycle to tilt until one of the wheels touches to ground, where the bicycle tilt takes a maximum value $\theta_{Od}$ which is defined as a predetermined maximum bicycle tilt (with deployed wheels at ground.) A flexibility of tilting by the gap 10 allows the rider to try and learn to stay balanced or to recover from a tilted condition during the exercise. From a design point of view, the bicycle and the rider are assumed to be protected from falling over at the predetermined maximum bicycle tilt $\theta_{Od}$. The value of the predetermined maximum bicycle tilt $\theta_{Od}$ can be selected by the supervisor by inputting the value from the user interface. A practical range would be between a few degree and about 30 degree, or more desirably between about 5 degree and about 30 degree under Mode 1 with the wheel deployed, although the value of $\theta_{Od}$ may depend on weight and height of the rider. A novice rider may start from a zero or a few degree of the predetermined maximum bicycle tilt $\theta_{Od}$, and can gradually increase the value with gaining a skill to balance in Mode 1. When, the rider reaches to a stage exercising under the Mode 2, the rider may desirably have experienced with the predetermined maximum bicycle tilt $\theta_{Od}$ of between about 10 degree and about 30 degree, more desirably between 15 degree and about 30 degree. This may be included in the restriction regarding the selection or the automatic transition of the mode from the Mode 1 to Mode 2.

FIG. 8B illustrates a safe threshold bicycle tilt $\theta_{BS}$, compared with the predetermined maximum bicycle tilt $\theta_{Od}$. The safe threshold bicycle tilt $\theta_{BS}$, a safe threshold angular velocity $\omega_{BS}$ and a safe threshold expected turning tilt $\theta_{TS}$, are all assumed to represent criteria within which the rider can safely control the bicycle without the aid of the supporting member 3 with the wheels 13. Naturally, the value for the safe threshold bicycle tilt $\theta_{BS}$ may be assumed smaller than the predetermined maximum bicycle tilt $\theta_{Od}$.

Figure 9:
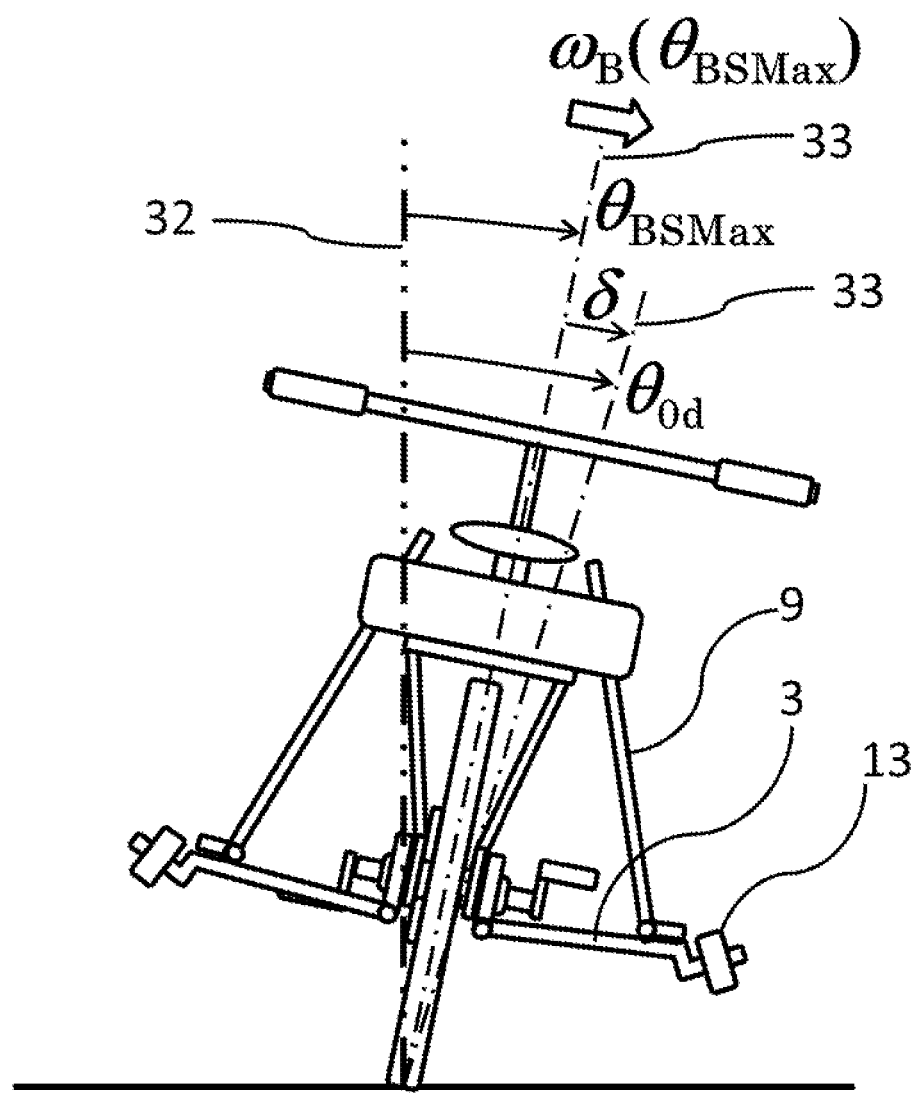
FIG. 9 is a rear view of the bicycle with the bicycle training aid with intelligent controller with the wheels retracted and tilted, and illustrates a concept of a predetermined maximum safe threshold bicycle tilt according to one aspect of the present disclosure.

FIG. 9 illustrates a situation where the supporting member 3 with the wheels 13 are at the retracted position (under the Mode 2) and those criteria introduced above come into play. When the rider and the bicycle fall over with the supporting member 3 with the wheels 13 at a retracted position, the wheels are not assumed to protect the rider on the bicycle from tipping over. Thus the supporting member 3 with the wheels 13 need to deploy back to the first position when the intelligent controller 23 decided a protection required. Such a deployment needs a response time $\Delta t$ to complete after the sensor has detected such a need. Thus, in order to complete the deployment before the bicycle falls down to the predetermined maximum bicycle tilt $\theta_{Od}$, a sensor signal requiring the protection need to be detected at a bicycle tilt $\theta_{BSMax}$ somewhat smaller than $\theta_{Od}$ given by:

$$\theta_{BSMax}=\theta_{Od}-\delta, \quad (2)$$

where $\delta$ is defined as a response margin angle, and is an increment of the bicycle tilt during the response time $\Delta t$, and $\theta_{BSMax}$ is defined as a predetermined maximum safe threshold bicycle tilt and gives a maximum limit to the safe threshold bicycle tilt $\theta_{BS}$.

When, the response margin angle $\delta$ is designed to be 5 (10) degree, and assuming the predetermined maximum bicycle tilt $\theta_{Od}$ is in a range of between 15 degree and 30 degree when the rider exercises under the Mode 2, the predetermined maximum safe threshold bicycle tilt $\theta_{BSMax}$ would be in a range of between 10 degree and 25 degree (10 degree and 20 degree) for the response margin angle $\delta=5$ (10) degree, from Eq. (2). This range would be practical, but desirably be between about 15 degree and about 25 degree from the point of allowing a wider range for exercise of the turning. This would be realized by choosing of the predetermined maximum bicycle tilt $\theta_{Od}$ in a range of between about 20 degree and about 30 degree, and the response margin angle $\delta$ lesser than about 5 degree.

The response margin angle $\delta$ may be required to satisfy following relation:

$$\delta \geq \omega_{BAV}(\delta) \times \Delta t \approx \omega_B(\theta_{BSMax}) \times \Delta t, \quad (3)$$

where, the first term $\omega_{BAV}(\delta)$ denotes an angular velocity averaged for a range $\delta$ of the bicycle tilt from $\theta_{BSMax}$ to $\theta_{Od}$, and may be approximated by $\omega_B(\theta_{BSMax})$, an angular velocity at the bicycle tilt $\theta_{BSMax}$, if $\delta$ was small enough. Since, the angular velocity can be measured by the sensor, and the response time $\Delta t$ can be determined in a design stage, the response margin angle $\delta$, and hence $\theta_{BSMax}$ can be determined in real time by the intelligent controller 23, applying Eqs. (2) and (3). Alternatively, when a maximum value of $\omega_{BAV}(\delta)$, denoted here as $\omega_{BAV}(\delta)_{Max}$ was given based on an empirical range of the angular velocity, a required range for the response margin angle $\delta$ can be predetermined by Eq. (3):

Conversely, when the response time $\Delta t$ and the response margin angle $\delta$ were given, Eq. (3) will give the maximum value, $\omega_{BAV}(\delta)_{Max}$. Here, although $\omega_{BAV}(\delta)_{Max}$ has been defined for the range $\delta$ of the bicycle tilt, it would also limit an allowable maximum angular velocity in all the range of the bicycle tilt, which is denoted here $\omega_{BSMax}$, and defined as a predetermined maximum safe threshold angular velocity. The predetermined maximum safe threshold angular velocity $\omega_{BSMax}$ would also limits the maximum value for the safe threshold angular velocity $\omega_{BS}$. Those relations may be represented by Eq. (4):

$$\frac{\delta}{\Delta t} \geq \omega_{BAV}(\delta)_{Max} \geq \omega_{BSMax} \geq \omega_{BS}. \qquad (4)$$

Limitations of Eqs. (3) and (4) arise from a requirement on the response capability of the driving mechanism to deploy the supporting member 3 with the wheels 13 in time before the bicycle falls down to the predetermined maximum bicycle tilt $\theta_{0d}$. Thus, to be practically acceptable, or feasible to protect the rider from falling down, the maximum values $\omega_{BAV}(\delta)_{Max}$, $\omega_{BSMax}$ given by Eq. (4) need to be greater than a practical range of the angular velocity that would be experienced under the Mode 2.

For example, assuming the response time $\Delta t$ of 0.1 sec, and the response margin angle $\delta$ of 5 degree (with the predetermined maximum bicycle tilt $\theta_{0d}$ of between 15 degree and 30 degree), Eq. (4) gives the maximum values of $\omega_{BAV}(\delta)_{Max}$ and $\omega_{BSMax}$ of 50 degree/sec. The ordinary skilled riders would stay within a range of the rolling angular velocity between about 10 degree/sec and about 30 degree/sec in their ordinary ride. Thus, restricting the maximum angular velocity at the predetermined maximum safe threshold bicycle tilt $\theta_{BSMax}$ below 50 degree/sec would be practically acceptable. However for safety, setting the value for the predetermined maximum safe threshold angular velocity $\omega_{BSMax}$ between about 20 degree/sec and about 40 degree/sec would be preferable, while choosing between about 20 degree/sec and about 30 degree/sec would be more safer solution, and both would be practically useful conditions for the training purpose. A larger value for the predetermined maximum safe threshold angular velocity $\omega_{BSMax}$ over 100 degree/sec may be realized by either or both of decreasing the response time $\Delta t$, down to 50 msec, and/or increasing the response margin angle $\delta$ up to 10 degree. However, the latter option would limit the allowable range of the bicycle tilt, by reducing the predetermined maximum safe threshold bicycle tilt $\theta_{BSMax}$ according to Eq. (2).

From above discussions, a maximum limit to the safe threshold expected turning tilt $\theta_{TS}$, defined as a predetermined maximum safe threshold expected turning tilt, and denoted as $\theta_{TSMax}$ may also be limited within the same range as that of the predetermined maximum safe threshold bicycle tilt $\theta_{BSMax}$, because beyond that value the supporting member 3 with the wheels 13 may not complete the deployment in time when the angular velocity may possibly be at the predetermined maximum safe threshold angular velocity $\omega_{BSMax}$.

The condition which the intelligent controller 23 may be configured to store and to make decision on satisfaction thereof, may include two types of criteria, one is an evolving criterion that is automatically updated based on a progress of the riding exercise, and the other is a "predetermined" criterion that may not be affected by the progress unless the supervisor modifies. The former may include the safe threshold bicycle tilt $\theta_{BS}$, the safe threshold angular velocity $\omega_{BS}$, and the safe threshold expected turning tilt $\theta_{TS}$. The latter may include the predetermined maximum safe threshold bicycle tilt $\theta_{BSMax}$, the predetermined maximum safe threshold angular velocity $\omega_{BSMax}$, and the predetermined maximum safe threshold expected turning tilt $\theta_{TSMax}$. Similarly, the predetermined algorithm controlling the procedure executed by the intelligent controller 23 based on the decision on the occurrence of the event may not be automatically altered by the progress of the exercise, unless the supervisor modifies. The predetermined algorithm may include a predetermined frequency count of the events accumulated, as a prerequisite to update the criterion included in the definition of the event, and a predetermined methodology adopted in updating the criterion. Before the rider starts the riding exercise, all the safe threshold values may be set to zero as an initial default value. The intelligent controller 23 may automatically update those values according to the progress of the riding exercise. On the other hands, the predetermined criteria may be installed in the manufacturing stage or may be input by the supervisor.

Under the Mode 1, the events which the intelligent controller 23 may be configured to store the conditions defining the occurrence of and to make the decision on satisfaction thereof, may include: a recovery event, a failure event and a self-sustained ride event, each will be defined below.

The recovery event is an event comprising a progress of the motion status indicating the rider's ability to control the bicycle at the motion status beyond a criterion presently stored, and may satisfy a condition comprising; i) a physical quantity experiences a peak in magnitude with a time derivative value thereof zero, at a value beyond a safe threshold of the physical quantity; ii) the motion status thereafter recovers within the safe threshold without surpassing a maximum safe threshold of the physical quantity; and 3) none of other physical quantities having other predetermined maximum safe thresholds defined thereof surpasses the other predetermined maximum safe threshold defined thereof, wherein, the physical quantity including either of the bicycle tilt, the angular velocity, or the expected turning tilt, and the other physical quantities comprising remaining of the bicycle tilt, the angular velocity, or the expected turning tilt, excluding the physical quantity. The peak value of the physical quantity that recovered from outside to inside of the safe threshold is defined as a recovery point.

Figure 10:
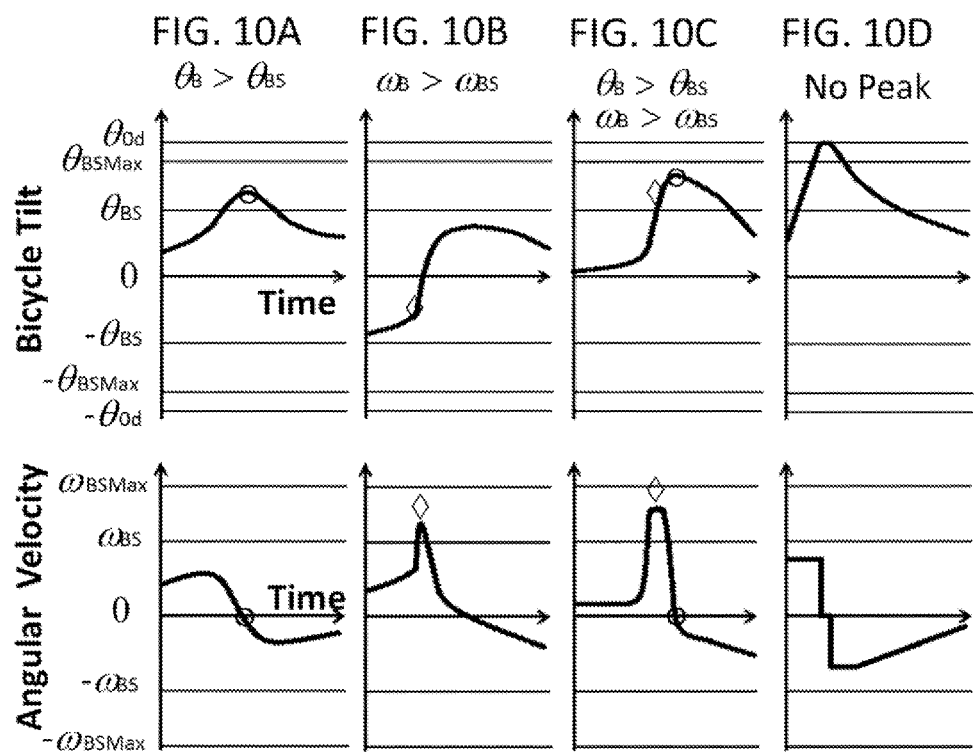
FIGS. 10A, 10B, 10C, and 10D are a set of graphs that illustrate a concept of a recovery event with examples according to one aspect of the present disclosure.

FIGS. 10A, 10B, 10C and 10D illustrate a concept of the recovery event, where cases of FIGS. 10A, 10B and 10C are examples for the recovery event satisfying all above conditions: FIG. 10A recovered from the bicycle tilt surpassing the safe threshold bicycle tilt $\theta_{BS}$; FIG. 10B recovered from the angular velocity surpassing the safe threshold angular velocity $\omega_{BS}$; FIG. 10C recovered from a motion status where both the bicycle tilt $\theta_B$ and the angular velocity $\omega_B$ surpassed the safe thresholds for some period. All three cases include the peak in magnitude, the recovery point, either in the bicycle tilt (illustrated by circles ○), in the angular velocity (illustrated by open diamonds ◇), or in both. On the other hand, the case FIG. 10D is not the recovery event, since it returned without the peak. Although, not illustrated here, it would be evident that the expected turning tilt also may have the recovery point under the above definition, since it can be monitored continuously as explained earlier. In all cases in FIGS. 10A to 10D, the expected turning tilt was assumed to have stayed within the safe threshold value thereof.

The intelligent controller 23 will store the value of the recovery point and accumulate a count of the recovery event for each physical quantity having the safe threshold value. When the count for a physical quantity has accumulated to the predetermined frequency count chosen from a range between 3 and 10, within a predetermined exercise period chosen from a range between a day and 7 days, the safe threshold of that physical quantity may be replaced by a new increased value that is determined from a group of the recovery points accumulated, by the predetermined algorithm, such as taking an average of the group, and so on.

The failure event is an event comprising a progress of the motion status indicating the rider's inability to control the bicycle at the motion status below a criterion presently stored, and may satisfy a condition comprising: i) a physical quantity concerning the motion status stays within the safe threshold of the physical quantity throughout the failure event; and ii) any of other physical quantities having predetermined maximum safe thresholds defined thereof has surpassed the predetermined maximum safe threshold defined thereof, wherein, the physical quantity comprising either of the bicycle tilt, the angular velocity, or the expected turning tilt, the other physical quantities comprising remaining of the bicycle tilt, the angular velocity, or the expected turning tilt, excluding the physical quantity. A failure point is defined as a value of the physical quantity when any of other physical quantities surpassed the predetermined maximum safe threshold defined thereof.

Figure 11:
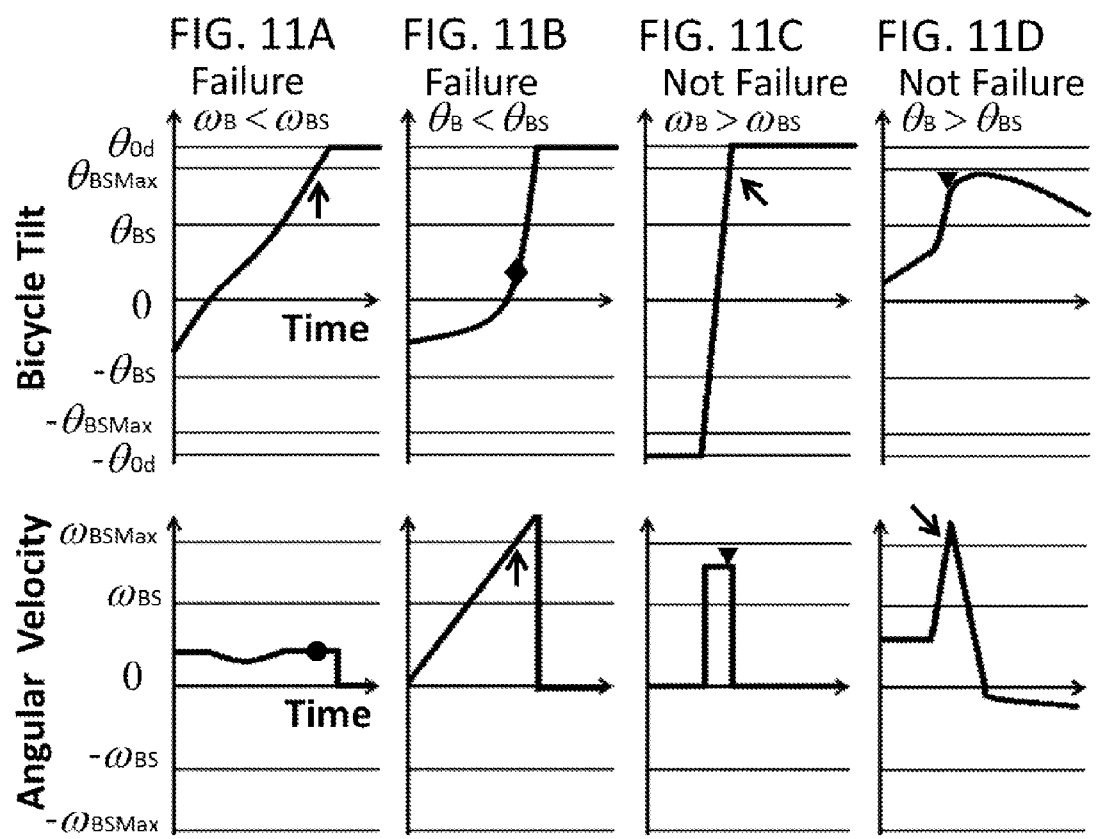
FIGS. 11A, 11B, 11C, and 11D are a set of graphs that illustrate a concept of a failure event with examples according to one aspect of the present disclosure.
Figure 12:
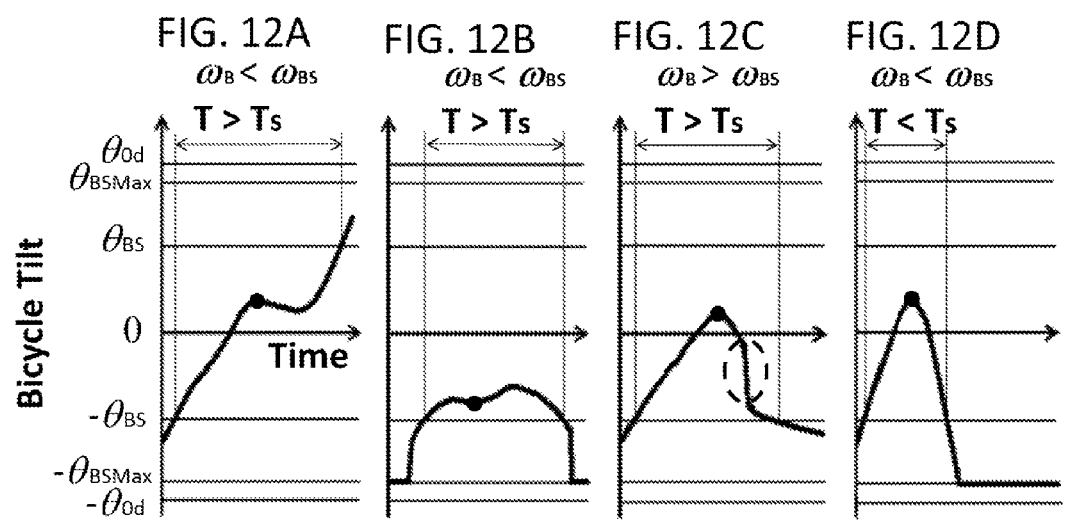
FIGS. 12A, 12B, 12C and 12D are a set of graphs that illustrate a concept of a self-sustained ride event with examples according to one aspect of the present disclosure.

FIGS. 11A, 11B, 11C, and 11D illustrate a concept of the failure event, where cases FIGS. 11A and 11B are the failure event because all above conditions are satisfied: in FIG. 11A the bicycle tilt $\theta_B$ surpassed the predetermined maximum safe threshold bicycle tilt $\theta_{BSMax}$ as indicated by the arrow (↑), when the angular velocity was within the safe threshold $\omega_{BS}$, at the point marked by the dot (●), which is the failure point of the angular velocity $\omega_B$; in FIG. 11B the angular velocity $\omega_B$ surpassed the predetermined maximum safe threshold angular velocity comma, as indicated by the arrow (↑), when the bicycle tilt $\theta_B$ was within the safe threshold bicycle tilt $\theta_{BS}$, at the point marked by the closed diamond (♦), which is the failure point of the bicycle tilt $\theta_B$. On the other hand, FIGS. 11C and 11D are not the failure event because both do not satisfy the third condition: in FIG. 11C the rolling angular velocity was not within the safe threshold angular velocity $\omega_{BS}$ as marked by the closed triangle (▼), when the bicycle tilt $\theta_B$ surpassed the predetermined maximum safe threshold $\theta_{BSMax}$ as marked by the arrow, and in FIG. 11D the bicycle tilt $\theta_B$ was not within the safe threshold bicycle tilt $\theta_{BS}$ as marked by the closed triangle (▼) when the rolling angular velocity $\omega_B$ surpassed the predetermined maximum safe threshold angular velocity $\omega_{BSMax}$, as marked by the arrow. Although, not illustrated here, it would be evident that the expected turning tilt also may have the failure point under the above definition, since it can be monitored continuously as explained earlier. In all cases in FIGS. 11A to 13D, the expected turning tilt was assumed to have had no failure point.

The intelligent controller 23 will store and accumulate a count of the failure event for each physical quantity having the safe threshold. When the count of the failure events for a physical quantity has accumulated to the predetermined frequency count, chosen from the range of between 3 and 10, within the predetermined exercise period, chosen from a range between a day and 7 days, the safe threshold of that physical quantity may be replaced by a new decreased value that is chosen from a group of the failure points accumulated, by the predetermined algorithm, such as taking the minimum, or the average of the group, and so on.

With the improvement of the skill of the rider, the safe threshold bicycle tilt $\theta_{BS}$, the safe threshold angular velocity $\omega_{BS}$, and the safe threshold expected turning tilt $\theta_{TS}$ will increase and approach to the predetermined maximum safe threshold values, which will be informed to the rider and the supervisor, through a human interface such as the display of the intelligent controller and that of the remote controller. When the safe threshold bicycle tilt $\theta_{BS}$ almost reaches to the predetermined maximum safe threshold bicycle tilt $\theta_{BSMax}$, the supervisor may set the gap 10 to a larger value allowed within the first position. In this way, the rider can experience a larger tilt under the protection of the supporting member 3 with the wheels 13, and can acquire the skill to balance in a greater range of the motion status.

The self-sustained ride event is an event comprising a progress of the motion status indicating the rider's ability to control the bicycle for over a predetermined duration with maintaining the motion status within criteria presently stored; and may satisfy a condition comprising: i) all the physical quantities including the bicycle tilt, the angular velocity and the expected turning tilt do not surpass the safe threshold values thereof presently stored; ii) during a period not shorter than the predetermined duration of the self-sustained ride event; iii) one of the physical quantities has experienced a peak in magnitude, where the time derivative thereof takes zero, during the period.

FIGS. 12A, 12B, 12C and 12D illustrate a concept of the self-sustained ride event. FIGS. 12A and 12B include the self-sustained ride event, because both satisfy all above conditions. In FIG. 12B, the magnitude of the angular velocity might have surpassed the safe threshold angular velocity $\omega_{BS}$ outside of the safe threshold bicycle tilt $\theta_{BS}$, which however is irrelevant to the requirements for the self-sustained ride. On the other hand, FIGS. 12C and 12D do not satisfy the self-sustained ride event, because: FIG. 12C involves the angular velocity $\omega_B$ surpassed the safe threshold angular velocity $\omega_{BS}$, although the bicycle tilt was within the safe threshold bicycle tilt $\theta_{BS}$, as illustrated by the dotted circle; FIG. 12D does not satisfy the duration requirement. Although not illustrated here, it has been assumed that the expected turning tilt has remained within the safe threshold expected turning tilt throughout the illustrated events.

The intelligent controller 23 will store the self-sustained ride event and accumulate a count of the self-sustained ride events. After the counts have accumulated to the predetermined frequency count chosen from the range between 3 and 10, within the predetermined exercise period chosen from the range between a day and 7 days, the intelligent controller may execute the procedure to direct the driving mechanism to cause the displacement of the action member 9 to place the supporting member 3 with the wheel 13 at the retracted position, based on an additional confirmation of the motion status presently progressing including: i) the supporting member with the wheel has been at a deployed position, ii) the predetermined maximum bicycle tilt $\theta_{Od}$ presently stored is not smaller than 10 degree, and iii) all the physical quantities concerning the motion status are within the criteria that are presently stored. When directed by the procedure, the intelligent controller may further actuate the driving mechanism so that the supporting member 3 with the wheels 13 will be retracted to the second position, and then the intelligent controller jumps to an operation algorithm for the Mode 2.

The Mode 2 where the supporting member 3 with the wheels 13 are at the second (retracted) position may be entered either by the automatic transition from the Mode 1, or by a choice of the supervisor. In the latter case, the ride under Mode 2 may start as the self-sustained ride by the rider alone, or by a support of the supervisor pushing and releasing the bicycle after the rider has reached the speed sufficient to gain the stability.

Under the Mode 2, when the intelligent controller 23 detected the need of the protection from falling over, the supporting member 3 with the wheels 13 need to deploy back to the first position as stated earlier. Also, in Mode 2 the rider is allowed to exercise the turn intentionally. Those aspects unique to the Mode 2 may affect the conditions defining the events.

Under the Mode 2, the events which the intelligent controller 23 may be configured to store the conditions defining the occurrence of and to make the decision on satisfaction thereof, may include: the recovery event; the failure event; the self-sustained ride event; and an un safe event. All the definitions for those events other than the unsafe event and corresponding procedures executed by the intelligent controller may remain same as those in the Mode 1 and may include the same procedures as those taken in the Mode 1 described above. By all means, the criteria that have been updated reflecting improvements of the skill of the rider in the Mode 1 have been stored and succeeded as components of the conditions in the Mode 2.

The unsafe event is an event that occurs under the Mode 2, and comprising a progress of the motion status indicating a need of an immediate deployment of the supporting member 3 with the wheel 13. Thus the corresponding action of the intelligent controller 23 when detected an occurrence of the unsafe event may include directing the driving mechanism 4 to cause the displacement of the action member 9 so that the supporting member 3 with the wheels 13 would deploy back to the first position.

The unsafe event may be either of:

i) the speed of the bicycle surpassed a predetermined maximum speed, ii) the bicycle tilt $\theta_B$ has surpassed the predetermined maximum safe threshold bicycle tilt $\theta_{BSMax}$ in magnitude;

iii) the angular velocity of the bicycle $\omega_B$ has surpassed the predetermined maximum safe threshold angular velocity $\omega_{BSMax}$ in magnitude;

iv) the expected turning tilt $\theta_T$ has surpassed the predetermined maximum safe threshold expected turning tilt $\theta_{TSMax}$ in magnitude;

v) the expected turning tilt $\theta_T$, the predetermined maximum safe threshold expected turning tilt $\theta_{TSMax}$ and the bicycle tilt $\theta_B$ satisfy following relations:

$$R_T < |\theta_T/\theta_{TSMax}| \leq 1,$$

and $$\Delta_B < |(\theta_B - \theta_T)|,$$

wherein, $R_T$, and $\Delta_B$ represents a predetermined safe turning tilt ratio, a predetermined safe bicycle tilt deviation, respectively;

vi) the expected turning tilt $\theta_T$, the predetermined maximum safe threshold expected turning tilt $\theta_{TSMax}$, the bicycle tilt $\theta_B$ and the rider's upper body tilt $\theta_P$ satisfy following relations:

$$R_T < |\theta_T/\theta_{TSMax}| \leq 1,$$

$$|(\theta_B - \theta_T)| \leq \Delta_B,$$

and $$\Delta_P < |(\theta_P - \theta_T)|,$$

wherein, $\Delta_P$ represents a predetermined safe rider's body tilt deviation; or vii) the expected turning tilt $\theta_T$, the predetermined maximum safe threshold expected turning tilt $\theta_{TSMax}$, the bicycle tilt $\theta_B$, the seat pressure for the right half of the seat $p_{SR}$, one for the left half of the seat $p_{SL}$ and an averaged seat pressure $p_0$ satisfy following relations:

$$R_T < |\theta_T/\theta_{TSMax}| \leq 1,$$

$$|(\theta_B - \theta_T)| \leq \Delta_B,$$

and $$R_P < |(\theta_{SR} - p_{SL})/p_0|,$$

where $R_P$ represents a predetermined safe seat pressure difference ratio, wherein, the predetermined maximum speed is between about 7 km/h and about 20 km/h, the predetermined maximum safe threshold bicycle tilt $\theta_{BSMax}$ in magnitude is between about 10 degree to about 25 degree, the predetermined maximum safe threshold expected turning tilt $\theta_{TSMax}$ in magnitude is between about 10 degree to about 25 degree, the predetermined maximum safe threshold angular velocity $\omega_{BSMax}$ in magnitude is between about 20 degree/sec and about 40 degree/sec, preferably between about 20 degree/sec and about 30 degree/sec, the predetermined safe turning tilt ratio $R_T$ is not greater than about 0.3, the predetermined safe bicycle tilt deviation $\Delta_B$ is not greater than about 5 degree;

the predetermined safe rider's body tilt deviation $\Delta_P$ is not greater than about 5 degree;

the predetermined safe seat pressure difference ratio $R_P$ is not greater than about 0.5.

The predetermined maximum speed would ordinary be set between about 7 km/h and about 20 km/h depending on progress of the skill of the rider. The predetermined maximum speed arises partly from empirical safety demand and also from a risk of making a high speed turn where the centrifugal force is not negligible. Calculations using Eq. (1) indicate that the turn with a radius 2 m or less at a speed of 7 km/h requires the expected turning tilt about 10 degree or more. A speed of 15 km/h requires about four times larger values for the expected turning tilt at the same radius. Thus the expected turning tilt will come into play seriously under such conditions and making such an extreme turn without experiences adjusting to the expected turning tilt need to be avoided in the Mode 1 and also at an early stage of the Mode 2. From such aspect, the rider would preferably be forbidden or encouraged to avoid making the turn intentionally or sharply in Mode 1 in general, and also in an early stage in the Mode 2.

The limitations on the predetermined maximum safe threshold bicycle tilt $\theta_{BSMax}$ and the predetermined maximum safe threshold angular velocity $\omega_{BSMax}$ arise because they have been determined so that when the bicycle falls over with $\omega_{BSMax}$, $\theta_{BSMax}$ is the last point (the maximum bicycle tilt) to trigger the deployment in order for the supporting member 3 with the wheels 13 to complete the deployment before the bicycle falls over to the predetermined maximum bicycle tilt $\theta_{Od}$, where one of the wheels 13 touches to ground when deployed, as stated earlier. The predetermined maximum bicycle tilt $\theta_{Od}$ in the exercise stage under the Mode 2 would range from about 15 degree to about 30 degree. When the response margin angle δ is 5 degree, Eq. (2) gives the predetermined maximum safe threshold bicycle tilt $\theta_{BSMax}$ in a range between 10 degree and 25 degree. The predetermined maximum safe threshold expected turning tilt $\theta_{TSMax}$ may also be limited within the same range, because beyond the predetermined maximum safe threshold bicycle tilt $\theta_{BSMax}$, the supporting member 3 with the wheels 13 may not complete the deployment in time when the angular velocity may possibly be at the predetermined maximum safe threshold angular velocity $\omega_{BSMax}$.

On the other hand, when the response time of 0.1 sec and the response margin angle of 5 degree are given, Eq. (4) gives a corresponding maximum value for the predetermined maximum safe threshold angular velocity $\omega_{BSMax}$ about 50 degree/sec. Thus, under such given conditions, selecting the predetermined maximum safe threshold angular velocity $\omega_{BSMax}$ from a range between about 20 degree/sec and about 40 degree/sec would be safe and further, selecting from a range between about 20 degree/sec and about 30 degree/sec would be safer and preferable. Those ranges of the predetermined maximum safe threshold angular velocity would be practically acceptable, although the larger, the better, and may depend on the response time of an available driving mechanism.

In making the turn, the rider and the bicycle are required to take an attitude inclined toward the center of the circle with the expected turning tilt $\theta_T$ in order to balance against the apparent gravity as a result of the effect of the centrifugal force, as discussed earlier concerning FIGS. 6 and 7. A considerable deviation of the bicycle tilt or of the rider's upper body tilt from the expected turning tilt would result in the unsafe event. Cases iv) to vii) of above listings for the unsafe events correspond to such situations.

Figure 13:
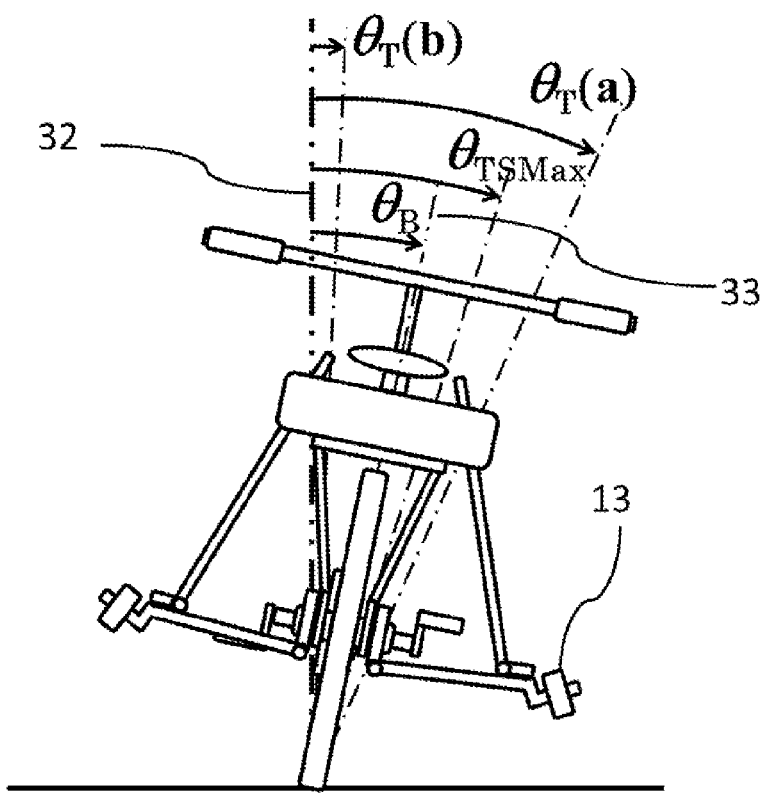
FIG. 13 is a rear view of the bicycle with the bicycle training aid with intelligent controller that illustrates two situations with two different expected turning tilts.

FIG. 13 illustrates two situations where effects of the turn are contrastive. In one situation, the expected turning tilt $\theta_T$ (a) is beyond the predetermined maximum safe threshold expected turning tilt $\theta_{TSMax}$ in magnitude. This situation may be unsafe from the definition, and corresponds to the unsafe event of case iv). In the other situation, the expected tilt $\theta_T$ (b) is small enough compared to the predetermined maximum safe threshold expected turning tilt $\theta_{TSMax}$ in magnitude, and the effects of the turn may be negligible. Thus, a ratio of the expected turning tilt $\theta_T$ to the predetermined maximum safe threshold expected turning tilt $\theta_{TSMax}$ in magnitude, $|\theta_T/\theta_{TSMax}|$ may be used to classify a seriousness of the effect of the turn for the rider. When $|\theta_T/\theta_{TSMax}|$ is greater than 1, the situation would be unsafe event of case iv). When the ratio $|\theta_T/\theta_{TSMax}|$ is not greater than a value $R_T$ defined as the predetermined safe turning tilt ratio, the effect of the turn may be regarded negligible. This $R_T$ may chosen from a range not greater than about 0.3, because $\theta_{TSMax}$ ranges from about 10 degree to 25 degree as stated earlier, and the expected turning tilt not greater than about 3 degree in magnitude may be deemed negligible. The predetermined safe turning tilt ratio may be set by a manufacturer as one of predetermined design parameters.

Figure 14:
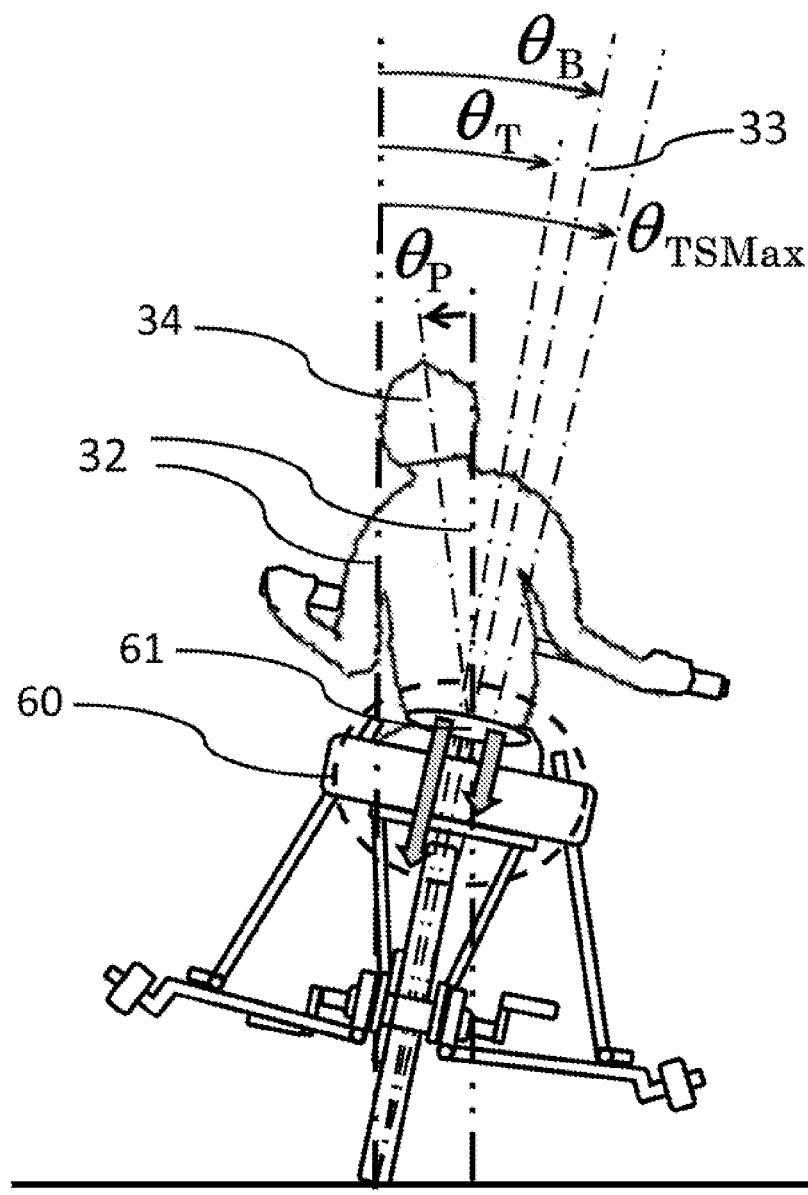
FIG. 14 is a rear view of the rider on the bicycle with the bicycle training aid with intelligent controller that illustrates a situation, where the rider's upper body tilt deviated to opposite side of the expected turning tilt while the bicycle tilt is closely matched to the expected turning tilt.

FIG. 14 illustrates a turning situation where the ratio $|\theta_T/\theta_{TSMax}|$ is greater than the predetermined safe turning tilt ratio $R_T$ but not greater than 1, thus the effects of the turn is not negligible and the situation need to be examined further in detail; the deviation of the bicycle tilt or one of the rider's upper body tilt from the expected turning tilt would come into play. Under this situation, the bicycle tilt $\theta_B$ and the rider's upper body tilt $\theta_P$ need to be equal to or close enough to the expected turning tilt $\theta_T$ to make the turn safely. The risk of the deviation of the bicycle tilt from the expected turning tilt has been already discussed earlier concerning FIGS. 6 and 7. The second criterion to be monitored would be a deviation of the bicycle tilt $\theta_B$ from the expected turning tilt $\theta_T$ in magnitude, that is, $|(\theta_B-\theta_T)|$. When this deviation has surpassed the predetermined safe bicycle tilt deviation $\Delta_B$, the situation corresponds to the case v) in the definition of the unsafe event. The predetermined safe bicycle tilt deviation $\Delta_B$ may be chosen from a range not greater than about 5 degree and may be set by a manufacturer as one of predetermined design parameters.

When the ratio of the expected turning tilt to the predetermined maximum safe threshold expected turning tilt $|\theta_T/\theta_{TSMax}|$ is greater than $R_T$ and not greater than 1, and also when the bicycle tilt has been adjusted close enough to the expected turning tilt so that $|(\theta_B-\theta_T)|$ is within the predetermined safe bicycle tilt deviation $\Delta_B$, another physical quantity to be monitored would be the rider's upper body tilt. FIG. 14 illustrates such a situation, where the rider's upper body tilt $\theta_P$ deviated to opposite side of the expected turning tilt $\theta_T$. When the deviation in magnitude $|(\theta_P-\theta_T)|$ has surpassed the predetermined safe rider's body tilt deviation $\Delta_P$, the situation corresponds to the case vi) in the definition the unsafe event. The predetermined safe rider's body tilt deviation $\Delta_P$ may be chosen from a range not greater than about 5 degree and may be set by a manufacturer as one of predetermined design parameters.

When the bicycle tilt is almost matched to the expected turning tilt ($\theta_B \approx \theta_T$), the deviation $|(\theta_P-\theta_T)|$ may be substituted by $|(\theta_P-\theta_T)|$, which then may be monitored by the seat pressure difference ratio $|(p_{SR}-p_{SL})/p_0|$ as discussed concerning FIG. 7 and shown here again in a broken line circle area 60 in FIG. 14. When this ratio surpasses a predetermined safe seat pressure difference ratio $R_P$, under the circumstance described here, the situation would corresponds to the case vii) in the definition of the unsafe event. The predetermined safe seat pressure difference ratio $R_P$ would be chosen from a range not greater than about 0.5, preferably from a range not greater than about 0.3, and may be set by a manufacturer as one of design parameters.

The recovery event, the failure event and the self-sustained ride event are all acceptable events also in the Mode 2, with the definitions same as made in the Mode 1, and the events will be counted and accumulated. However, as understood from above definitions and discussions on the unsafe event, the failure event defined in the Mode 1 may also be treated as the unsafe event when occurred in the Mode 2. Thus for example, when any of the events shown in FIG. 11 occurred under the Mode 2, it is treated as the unsafe event, and at the same time, the same action procedures for the failure events as under the Mode 1 would be taken.

Several features may be added to the first aspect of the present disclosures, according to the second aspect of the present disclosures.

The deployment motion of the supporting member 3 with the wheels 13 toward ground can be accelerated by a resilient member 7 (such as a spring). The spring 7 attaches at one end to the member 5 and at the other end to the supporting member 3, as illustrated in FIG. 3. The member 5 is attached at one end thereof to the hub of the rear wheel.

When the intelligent controller 23 has detected that the conditions have been met or has decided any of the events that have been defined and stored has occurred, the procedure taken by the intelligent controller 23 may further include to notice the rider and the supervisor what event has occurred and why or how that event has occurred, through the human interface by the sound, by the voice message or by the display.

From the remote controller 15, the supervisor may send an external instruction as an order to the intelligent controller 23 to deploy the supporting member 3 with the wheels 13 when she decided necessary. Then the order may override the decision of the intelligent controller 23. The intelligent controller 23 then will store the motion status for a predetermined period preceding the external instruction as an additional condition providing an additional path for the occurrence of the unsafe event, with the procedure of directing the deployment of the supporting member with the wheel. With those additional operations, the supervisor can educate the intelligent controller 23 so that it takes a safer side protection than ordinal decisions, for example when the supervisor finds the rider has a tendency to fail in a particular riding mode.

Under the Mode 1, the rider was forbidden making the turn intentionally or sharply, in general, in the first aspect of the invention. In the second aspect of the invention, a turning exercise may be allowed at an advanced stage under the Mode 1 except for the sharp turning; when the safe threshold bicycle tilt and the safe threshold angular velocity have improved so that the predetermined maximum bicycle tilt $\theta_{Od}$ has surpassed a threshold for the intentional turning exercise, which may be chosen from a range between about 10 degree and about 15 degree. The rider may try a moderate turn and learn the sense of the expected turning tilt, under the protection of the deployed wheels. When this mode defined as a Mode 3 was selected, the intelligent controller may switch to the Mode 3 and add to the predetermined conditions under the Mode 1, the cases iv) to vii) of the unsafe event conditions that are defined for the Mode 2 related to the turning situation. The corresponding procedure of the intelligent controller when either of those unsafe events has been detected would be to notice the rider what was a mistake and what should be a correct operation, through the human interface either by the voice message or by the display attached to the bicycle.

Advantages of above embodiments of the present disclosures over the background art are discussed below. In the embodiments above described, the intelligent controller under present disclosures, not only stores the condition, monitors the motion status, makes comparison with the sensor signal and takes a predetermined controlling procedure, but also can automatically update the conditions based on events showing successes or failures of the rider according to the predetermined algorithm and can give notices of the successes or the failures to the rider and the supervisor in real time. This learning function of the intelligent controller allows the rider more flexible and more efficient exercises tailored for the skill status of the rider than the known art ever reported. The active communications with the rider and the supervisor provide the rider advices in real time far more precisely than ever. The notice in real time may give an effective feedback to the rider, may enable the rider to avoid entering into a further dangerous motion status by knowing the failure event in early stage. Those would be new and advantageous features of the above embodiments under the present disclosures over all known approaches cited in the background section.

All examples and conditional languages recited herein are intended for pedagogical purposes to aid the reader in understanding the disclosures and the concepts contributed by the inventor to furthering the art, and are to be construed as being without limitations to such specifically recited examples and conditions, nor does the organization of such examples in the specifications relate to a showing of the superiority and inferiority of the disclosures.

While the present description is provided the main teachings of the present disclosures, it will be appreciated by one of ordinary skill in the art that the invention is not limited to these specific embodiments, but also provide adequate support for equivalent structures and methods for accomplishing the same objectives.

What is claimed is:

1. A bicycle training aid comprising:
    a supporting member configured to be attached at one end thereof to a bicycle, having a wheel disposed at the other end, and further configured to retract or deploy with the wheel;
    an action member attached at one end thereof to the supporting member;
    a driving mechanism attached to the bicycle and configured to engage the action member at the other end thereof and to cause a displacement of the action member;
    a motion sensor configured to produce a sensor signal concerning a motion status of either of the bicycle or a rider; and
    a controller configured to
        receive the sensor signal and monitor the motion status based on the sensor signal;
        determine that an event has occurred in response to detecting a condition;
        execute a procedure in response to a determination that the event has occurred, according to a predetermined algorithm, the procedure including at least one of directing the driving mechanism to cause the displacement and resetting the condition; and
        actuate the driving mechanism when directed to do so by the procedure, wherein the controller is configured to store an identity of the rider, the condition defining the event for the rider including updated values in a traceable form, in a nonvolatile memory, and configured to display a time dependent progress of the condition according to a request by the rider.

2. The bicycle training aid of claim 1, wherein
    the condition being for a recovery event indicating an ability of the rider to control the bicycle at the motion status beyond a criterion for a physical quantity presently stored, and
    the procedure causes the controller to
        store a record of the recovery event, and add a count to a frequency count of the recovery event in the physical quantity, and
        update the criterion with an increased value when the frequency count of the recovery event in the physical quantity has accumulated up to a predetermined frequency count.

3. The bicycle training aid of claim 1, wherein:
    the condition being for a failure event indicating an inability of the rider to control the bicycle at the motion status within a criterion for a physical quantity presently stored, and
    the procedure causes the controller to
        store a record of the failure event and add a count to a frequency count of the failure event in the physical quantity; and
        update the criterion with a decreased value when the frequency count of the failure event in the physical quantity has accumulated up to a predetermined frequency count.

4. The bicycle training aid of claim 1, wherein:
    the condition being for a self-sustained ride event indicating an ability of the rider to control the bicycle at the motion status within criteria for physical quantities presently stored for a predetermined duration; and
the procedure causes the controller to
store a record of the self-sustained ride event, and add a count to a frequency count of the self-sustained ride event; and
direct the driving mechanism to cause the displacement of the action member and place the supporting member with the wheel at a retracted position when the supporting member with the wheel has been at a deployed position and when the frequency count has accumulated up to a predetermined frequency count within a predetermined exercise period, based on a further confirmation including the motion status being within the criteria presently stored.

5. The bicycle training aid of claim 1, wherein:
the condition being for an unsafe event indicating a need of a deployment of the supporting member with the wheel, and occurring while the supporting member with the wheel being at a retracted position, and
the procedure causes the controller to direct the driving mechanism to cause the displacement of the action member and place the supporting member with wheel at a deployed position.

6. The bicycle training aid of claim 1, wherein:
the supporting member with the wheel being at a retracted position,
the controller further including;
a remote controller having a human interface that outputs the motion status and accepts an external instruction,
a wireless transceiver configured to communicate with the remote controller, and
the condition being for the event that the controller having received the external instruction that requests an immediate deployment of the supporting member with the wheel; and
the procedure causes the controller to
override the decision recently made and having the procedure conflicts with the external instruction,
direct the driving mechanism to cause a displacement of the action member and place the supporting member with the wheel at a deployed position; and
store the motion status for a predetermined period preceding the external instruction as an additional condition providing an additional path for an occurrence of an additional event, with an additional procedure of overriding the decision and directing the deployment of the supporting member with the wheel.

7. The bicycle training aid of claim 2, wherein:
the condition further including
a physical quantity that experiences a peak at a value beyond a safe threshold of the physical quantity in magnitude,
the motion status thereafter recovers within the safe threshold without surpassing a predetermined maximum safe threshold of the physical quantity, and
no other monitored physical quantity surpasses the predetermined maximum safe threshold of the other monitored physical quantity,
the record includes a recovery point defined as the physical quantity at the peak,
the predetermined algorithm includes applying a mathematical analysis to a distribution of the recovery points,
wherein
the physical quantity includes at least one of a bicycle tilt, an angular velocity, and an expected turning tilt,
the other monitored physical quantities include a remaining of the bicycle tilt, the angular velocity, and the expected turning tilt, excluding the physical quantity,
wherein,
the predetermined frequency count is in an inclusive range of 3 through 10,
the predetermined exercise period is in an inclusive range of a day through 7 days,
the predetermined maximum safe threshold bicycle tilt is in an inclusive range of 5 degree through 25 degree,
the predetermined maximum safe threshold angular velocity is in an inclusive range of 20 degree/sec through 40 degree/sec, and
the predetermined maximum safe threshold expected turning tilt is in an inclusive range of 5 degree through 25 degree.

8. The bicycle training aid of claim 3, wherein:
the condition further including
a physical quantity concerning the motion status stays within a safe threshold of the physical quantity throughout the failure event; and
other monitored physical quantity surpasses a predetermined maximum safe threshold of the other monitored physical quantity,
the record includes a failure point defined as a value of the physical quantity when the other monitored physical quantity surpasses the predetermined maximum safe threshold,
the predetermined algorithm includes applying a mathematical analysis to a distribution of the failure points,
wherein,
the physical quantity comprising at least one of a bicycle tilt, an angular velocity, and an expected turning tilt,
other monitored physical quantity include a remaining of the bicycle tilt, the angular velocity, and the expected turning tilt, excluding the physical quantity,
wherein
the predetermined frequency count is in an inclusive range of 3 through 10,
the predetermined exercise period is in an inclusive range of a day through 7 days,
the predetermined maximum safe threshold bicycle tilt is in an inclusive range of 5 degree through 25 degree,
the predetermined maximum safe threshold angular velocity is in an inclusive range of 20 degree/sec through 40 degree/sec, and
the predetermined maximum safe threshold expected turning tilt is in an inclusive range of 5 degree through 25 degree.

9. The bicycle training aid of claim 4, wherein:
the condition further including
physical quantities including a bicycle tilt, an angular velocity and an expected turning tilt do not surpass safe thresholds thereof presently stored during a period not shorter than the predetermined duration of the self-sustained ride event; and
one of the physical quantities experiences a peak in magnitude, where a time derivative thereof takes zero, during the period; and
the further confirmation of the procedure including a predetermined maximum bicycle tilt presently stored being not smaller than 10 degree,
the criteria including the safe thresholds of the bicycle tilt, of the angular velocity and of the expected turning tilt, wherein,
the predetermined exercise period is in an inclusive range of 1 day through 7 days,
the predetermined frequency count is in an inclusive range of 3 and through 10,
the predetermined duration of the self-sustained ride event is in an inclusive range of 2 sec through 10 sec.

10. The bicycle training aid of claim 5, wherein:
the condition further including, one of:
a moving speed of the bicycle has surpassed a predetermined maximum speed;
a bicycle tilt defined as an angle of a vertical axis of the bicycle relative to a vertical line has surpassed a predetermined maximum safe threshold bicycle tilt in magnitude;
an angular velocity defined as a time derivative of the bicycle tilt has surpassed a predetermined maximum safe threshold angular velocity in magnitude;
an expected turning tilt $\theta_T$ for a currently entering turn has surpassed a predetermined maximum safe threshold expected turning tilt $\theta_{TSMax}$ in magnitude;
the expected turning tilt $\theta_T$, the predetermined maximum safe threshold expected turning tilt $\theta_{TSMax}$ and the bicycle tilt $\theta_B$ satisfy following relations:

$R_T < |\theta_T/\theta_{TSMax}| \leq 1$, and $\Delta_B < |(\theta_B - \theta_T)|$, wherein, $R_T$, and $\Delta_B$ represents a predetermined safe turning tilt ratio, a predetermined safe bicycle tilt deviation;
the expected turning tilt $\theta_T$, the predetermined maximum safe threshold expected turning tilt $\theta_{TSMax}$ and the bicycle tilt $\theta_B$ and a rider's upper body tilt $\theta_P$ satisfy following relations:

$R_T < |\theta_T/\theta_{TSMax}| \leq 1$, $|(\theta_B - \theta_T)| \leq \Delta_B$, and $\Delta_P < |(\theta_P - \theta_T)|$, wherein, $\Delta_P$ represents a predetermined safe rider's body tilt deviation; or
the expected turning tilt $\theta_T$, the predetermined maximum safe threshold expected turning tilt $\theta_{TSMax}$ and the bicycle tilt $\theta_B$ and a pressure for a right half of a seat $p_{SR}$ and one for a left half $p_{SL}$ and an averaged seat pressure $p_0$ satisfy following relations:

$R_T < |\theta_T/\theta_{TSMax}| \leq 1$, $|(\theta_B - \theta_T)| \leq \Delta_B$, and $R_P < |(p_{SR} - p_{SL})/p_0|$, where $R_P$ represents a predetermined safe seat pressure difference ratio,
wherein,
the predetermined speed limit is in an inclusive range of 7 km/h through 20 km/h,
the predetermined maximum safe threshold bicycle tilt $\theta_{BSMax}$ in magnitude is in an inclusive range of 5 degree through 25 degree, the predetermined maximum safe threshold expected turning tilt $\theta_{TSMax}$ in magnitude is in an inclusive range of 10 degree through 25 degree,
the predetermined maximum safe threshold angular velocity $\omega_{BSMax}$ in magnitude is in an inclusive range of 20 degree/sec through 40 degree/sec,
the predetermined safe turning tilt ratio $R_T$ is not greater than about 0.3,
the predetermined safe bicycle tilt deviation $\Delta_B$ is not greater than about 5 degree,
the predetermined safe rider's body tilt deviation $\Delta_P$ is not greater than about 5 degree,
the predetermined safe seat pressure difference ratio $R_P$ is not greater than about 0.5.

11. The bicycle training aid of claim 1, wherein:
the end of the action member that engages the driving mechanism includes teeth, and
the driving mechanism includes an electric motor, other teeth driven by the electric motor and engage the teeth of the action member, and a latch to hold the supporting member, wherein the latch holds teeth or the supporting member after the supporting member with the wheel has completed the displacement.

12. The bicycle training aid of claim 1, wherein the driving mechanism further comprising:
a resilient member configured to accelerate the deployment of the supporting member with the wheel.

13. The bicycle training aid of claim 1, wherein the sensor includes one of an orientation sensor, a gyroscope, a speed sensor, an acceleration sensor, a seat pressure sensor, a seat pressure sensor that is configured to measure a pressure for a right half and one for a left half of the seat independently, and an angular sensor to detect an angle of a handlebar relative to a longitudinal axis of a bicycle body.

14. The bicycle training aid of claim 13, wherein the controller is configured to use the pressure difference between the pressure of the right half and one for the left half of the seat, or a ratio of the seat pressure difference normalized by the averaged seat pressure to monitor the deviation of the rider's upper body tilt from the bicycle axis.

15. The Bicycle training aid of claim 13, wherein the controller is configured to transfer from standby mode to operation mode, or vice versa, or to switch on or off a power based on a signal from a seat pressure sensor.

16. The bicycle training aid of claim 13, wherein the controller is configured to estimate an expected turning tilt based on a signal from the acceleration sensor.

17. The bicycle training aid of claim 1, wherein the controller further including:
a human interface including
an output device including one of a display to indicate an information concerning the motion status of the bicycle or the rider and a speaker;
an input device to accept an external input; and
a remote controller connected by a wireless communication including an human interface for output and input,
wherein, the controller makes a notice of the occurrence of the event immediately after the occurrence to the rider and the remote controller either by the output device, the notice including
a type of the event, and
a possible cause of the event including reason of failure or recovery.

18. The bicycle training aid of claim 1, wherein a height of the wheel from the ground at the deployed position being configured to be adjustable by an input from a user interface.

19. A bicycle training aid comprising:

a supporting member configured to be attached at one end thereof to a bicycle and having a wheel disposed at the other end;

first means for causing a transition of the supporting member between a first position where the wheel situates above the ground but maintaining protection of the bicycle from falling over, and a second position where the wheel does not protect the bicycle from falling over;

second means for detecting a physical quantity concerning a motion status of the bicycle or a rider body and generating a signal;

third means for controlling the first means, receiving the signal, making a decision whether a condition has been met, executing a procedure including at least one of directing the first means a predetermined transition and renewing a threshold value for the motion status included in the condition, based on the decision on an occurrence of an event showing a safe recovery from the motion status outside of the threshold value or a failure at the motion status within the threshold value, and actuating the first means when directed by the procedure, and fourth means for sending signals from the second means to the third means and from the third means to the first means.

* * * * *